(12) United States Patent
Fuji et al.

(10) Patent No.: US 6,876,603 B2
(45) Date of Patent: Apr. 5, 2005

(54) INFORMATION WRITE/READ HEAD INCLUDING AN OPTICAL SLIT HAVING A LIGHT EMITTING SECTION WHOSE WIDTH IS SHORTER THAN A LIGHT BEAM DIFFRACTION LIMIT

(75) Inventors: Hiroshi Fuji, Soraku-gun (JP); Hiroyuki Katayama, Nara (JP); Kunio Kojima, Nabari (JP); Kenji Ohta, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 489 days.

(21) Appl. No.: 09/864,060

(22) Filed: May 23, 2001

(65) Prior Publication Data

US 2002/0003752 A1 Jan. 10, 2002

(30) Foreign Application Priority Data

May 23, 2000 (JP) ...................................... 2000-151672
May 17, 2001 (JP) ...................................... 2001-148367

(51) Int. Cl.$^7$ .............................................. G11B 11/00
(52) U.S. Cl. ................................................. 369/13.13
(58) Field of Search ........................... 369/13.13, 13.24, 369/13.29, 13.32–13.33, 112.01, 112.02, 112.23, 112.24, 112.21, 112.2

(56) References Cited

U.S. PATENT DOCUMENTS

| | | | |
|---|---|---|---|
| 5,161,134 A | * 11/1992 | Lee | 369/13.32 |
| 5,689,480 A | * 11/1997 | Kino | 369/14 |
| 5,859,814 A | * 1/1999 | Kino et al. | 369/13.33 |
| 5,883,872 A | * 3/1999 | Kino | 369/112.24 |
| 5,982,716 A | * 11/1999 | Kino et al. | 369/14 |
| 6,181,478 B1 | * 1/2001 | Mandella | 359/642 |
| 6,288,981 B1 | * 9/2001 | Yoshida et al. | 369/13.17 |
| 6,396,776 B1 | * 5/2002 | Ueyanagi | 369/13.33 |
| 6,507,540 B1 | * 1/2003 | Berg et al. | 369/13.13 |
| 6,563,781 B2 | * 5/2003 | Hasegawa et al. | 369/118 |
| 6,567,347 B1 | * 5/2003 | Fujimaki et al. | 369/13.02 |
| 6,687,196 B1 | * 2/2004 | Ueyanagi | 369/13.33 |

FOREIGN PATENT DOCUMENTS

JP          11-185264          7/1999

OTHER PUBLICATIONS

"Optimum Design of Magneto–Optical Disk Structure" (K. Ohta, Proceeding of Magneto–Optical Recording International Symposium '91, J. Magn. Soc. Jpn., vol. 15, Supplement No: S1 (1991), pp. 351–356.).

"A New Perpendicular Magnetic Recording Method with a Magnetic–Optical Common Preformat" (Hideki Saga, et al., Proceeding of Magneto–Optical Recording International Symposium '99, J. Magn. Soc. Jpn., vol. 23, Supplement No. S1 (1999), pp. 225–228.).

(Continued)

Primary Examiner—Angel Castro
(74) Attorney, Agent, or Firm—David G. Conlin; William J. Daley, Jr.; Edwards & Angell, LLP

(57) ABSTRACT

An information write/read head writes or reads information on or from recording tracks by the heat-assisted system. The information write/read head includes a magnetic head provided in such a manner that a longitudinal direction of a magnetic gap crosses a scanning direction. Further, the information write/read head includes an aperture slit having a length of not less than a diffraction limit of a light beam, and a width shorter than the diffraction limit in the direction orthogonal to the recording track, which is formed in such a manner that the longitudinal direction thereof is aligned in a scanning direction of the recording track.

22 Claims, 13 Drawing Sheets

OTHER PUBLICATIONS

"High Density Thermomagnetic Recording on Flux Detectable RE–TM Media" (Hiroaki Nemoto, et al., Proceedings of Magneto–Optical Recording International Symposium '99, J. Magn. Soc. Jpn., vol. 23, Supplemental No. S1 (1999), pp. 229–232.).

"New Magnetic Recording Method Using Laser Assisted Read/Write Technologies" (Hiroyuki Katayama, et al., Proceedings of Magneto–Optical Recording International Symposium '99, J. Magn. Soc. Jpn., vol. 23, Supplement No. S1 (1999), pp. 233–236.).

"Near Field Laser Intensity Modulation SIL MO Recording in TbFeCo Magneto–Optical Media" (A. Chekanov, et al., Proceedings of Magneto–Optical Recording International Symposium '99, J. Magn. Soc. Jpn., vol. 23, Supplement No. S1 (1999), pp. 261–264.).

"Laser–Assisted magnetic Recording Technologies" (Hiroyuki Katayama, et al., J. Magn. Soc. Jpn., vol. 23, No. 8, 1999, pp. 1901–1906).

\* cited by examiner

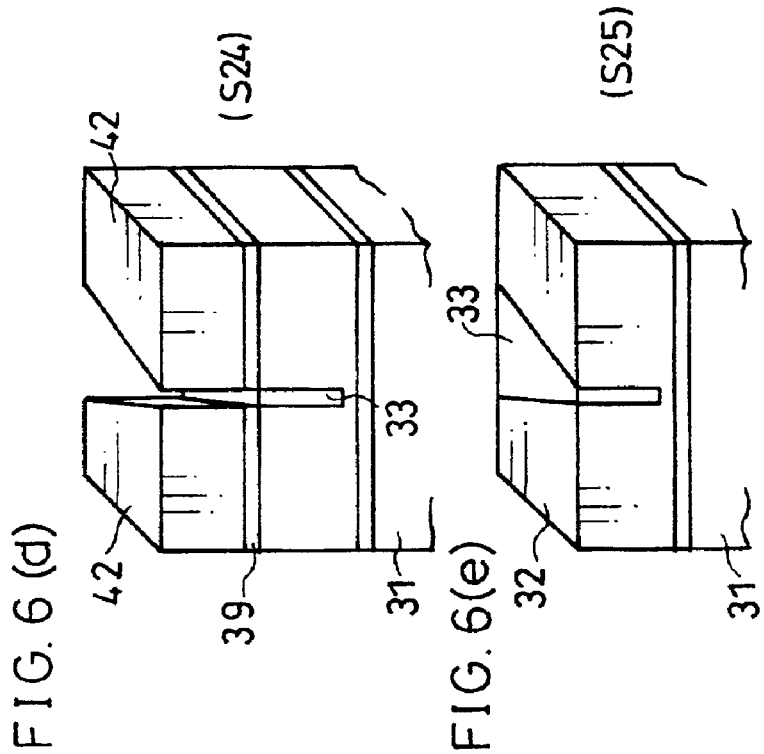
FIG. 6(d) (S24)
FIG. 6(e) (S25)
FIG. 6(a) (S21)
FIG. 6(b) (S22)
FIG. 6(c) (S23)

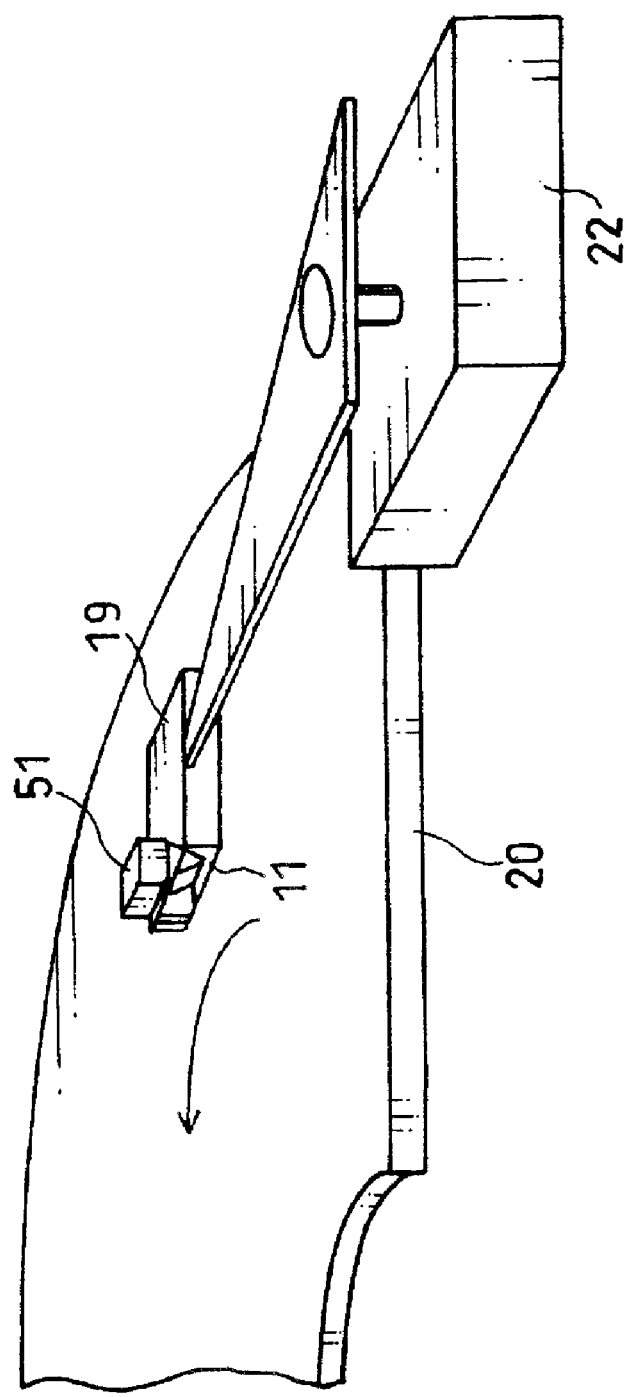

INFORMATION WRITE/READ HEAD INCLUDING AN OPTICAL SLIT HAVING A LIGHT EMITTING SECTION WHOSE WIDTH IS SHORTER THAN A LIGHT BEAM DIFFRACTION LIMIT

FIELD OF THE INVENTION

The present invention relates to an information write/read head, such as a thermo-magnetic write/read head for writing/reading information by the heat-assisted write/read system, an information writing/reading device adopting such information write/read head, an information recording medium such as an information writing/reading disk, etc., and a tracking device which performs a tracking operation with respect to the information recording medium.

BACKGROUND OF THE INVENTION

In recent years, in order to realize magnetic disks of higher recording density (track density), techniques for magnetically writing/reading information while heat-assisting with a laser beam (heat-assisted write/read system) have been developed. The magnetic recording media for writing and reading by the foregoing heat-assisted read/write system and the writing/reading method based on the heat-assisted read/write system are disclosed, for example, in Journal of Magnetics Society of Japan Vol. 23 Supplement, No. S1(1999), pp. 233–236 or an Journal of Magnetics Society of Japan "Vol. 23, No. 8, 1999, pp. 1901–1906".

FIG. 12 is a cross-sectional view of an information writing/reading device, which explains the writing/reading method by the heat-assisted read/write system. As illustrated in FIG. 12, a light beam 102 emitted from an optical head 101 is projected onto a magnetic recording medium 104 formed on a disk substrate 103. In this writing/reading method, the light beam 102 projected onto the recording medium 104 is used in performing a tracking control and raising the temperature of the recording medium 104. The information writing/reading device is structured such that a magnetic head 105 is provided opposing the optical head 101 via the disk substrate 103 and the recording medium 104. The information writing/reading device performs a writing/reading operation with respect to an area (high temperature area) irradiated with the light beam 102.

FIG. 13 is a plan view of the information writing/reading device of FIG. 12. When writing, a light beam of a high intensity is projected onto the recording medium 104 so as to heat the recording medium 104 to a writing temperature. In the portion of the high temperature area 106 (area heated to or above the writing temperature) of the recording medium 104, where a writing magnetic field is applied from the magnetic head 105, the magnetization direction is reversed according to the information, and the information are digitally written based on the magnetization direction. In the foregoing structure, by scanning the light beam 102 and the magnetic head 105 at the same time in a direction of an arrow shown in FIG. 13, recording marks 107 are sequentially written on recording tracks of the recording medium 104.

On the other hand, when a reading operation is performed in the information writing/reading device, a light beam 102 of a lower intensity than that of the light beam 102 used when writing is projected on the recording medium 104 so as to heat the portion irradiated with the light beam of the recording medium 104 to a reading temperature. Then, the magnetic field generated from the recording marks 107 in the portion of the high temperature area 106 (an area heated to or above a reading temperature) covered with the magnetic head 105 is read out from the magnetic head 105, thereby reading written information. As described, by scanning the light beam 102 and the magnetic head 105 at the same time in a direction of the arrow shown in the Figure, it is possible to sequentially read information written in each recording mark 107.

However, the foregoing conventional structure has a limit in increasing the density of the recording track. Specifically, in the information writing/reading device of FIG. 13, the linear density of the recording marks 107 formed along the recording tracks is determined by a width of a magnetic gap of the magnetic head 105, and in this structure, writing and reading operations can be performed with respect to the recording marks 107 formed at intervals of not more than 0.5 μm.

On the other hand, in the foregoing conventional information writing/reading device, in the direction orthogonal to the direction of the recording tracks, the width of each recording mark 107 (the length in the direction orthogonal to the recording track) which is defined by a spot diameter of the light beam 102 is around 1 μm at the minimum due to the diffraction limit of the light beam 102, which hinders an increase in the density of the recording tracks formed on the recording medium 104.

SUMMARY OF THE INVENTION

An object of the present invention is to provide an information write/read head and an information writing/reading device provided with the information write/read head, which realize improved recording track density by reducing the recording track width (length in the direction orthogonal to the recording tracks).

Another object of the present invention is to provide an optimal information recording medium for the information write/read head and the information writing/reading device of the present invention.

In order to achieve the above object, an information write/read head for a heat-assisted read/write system wherein a recording track on a recording medium is partially heated by projecting thereto a light beam, is characterized by including:

a magnetic head for magnetically writing or reading information with respect to the recording track; and an optical slit which allows the light beam for use in heating the recording track to pass therethrough to be guided to the recording track, wherein the optical slit includes a light emitting section whose width is shorter than a diffraction limit of the light beam.

According to the foregoing structure, the width of a light beam which has passed through the aperture slit and is projected on the recording medium can be reduced to be shorter than the diffraction limit of a light beam. As a result, a significantly narrower recording track width can be realized as compared to the conventional heat-assisted system based on the laser spot diameter which cannot be formed any smaller than the diffraction limit of the light beam. It is therefore possible to increase the recording density of the recording track several times to ten times higher than the recording density obtained in the conventional heat-assisted system.

In order to achieve the above object, an information writing/reading device of the present invention is characterized by including the foregoing information write/read head; and an optical system for guiding the light beam to a light incident section of the optical slit. With the foregoing information writing/reading device, it is possible to increase the recording density of the recording track several times to ten times higher than the recording density obtained in the conventional heat-assisted system.

In order to achieve the above object, an information recording medium is characterized by including:

tracking-use marks for writing information based on changes in refractive index, which are formed along recording tracks; and data areas for writing information magnetically, which are formed along the recording tracks, wherein the tracking-use marks have a length of not shorter than a diffraction limit of a light beam in a direction along the recording tracks and a width of not wider than the diffraction limit of the light beam in a direction orthogonal to the recording tracks.

According to the foregoing structure, by forming the tracking-use marks in shape corresponding to the shape of the optical slit, the tracking-use marks can be detected efficiently using the light transmitted through the optical slit, and moreover a high resolution can be realized in a direction orthogonal to the recording tracks. Therefore, by adopting the information reading medium of the present invention to the information write/read head and the information writing/reading device, it is possible to perform a tracking operation with high precision.

For a fuller understanding of the nature and advantages of the invention, reference should be made to the ensuing detailed description taken in conjunction with the accompanying drawings.

BRIEF DESCRIPTION OF THE DRAWINGS

FIG. 6($a$) through FIG. 6($e$) are process diagrams schematically illustrating manufacturing processes of essential parts of the information write/read head.

FIG. 7 is an explanatory view illustrating another information writing/reading device of the present invention.

FIG. 9($c$) is a waveform diagram of the tracking signal for the tracking area.

DESCRIPTION OF THE EMBODIMENTS

The following will explain embodiments of the present invention in reference to FIG. 1 through FIG. 11.

First Embodiment

Figure 1:
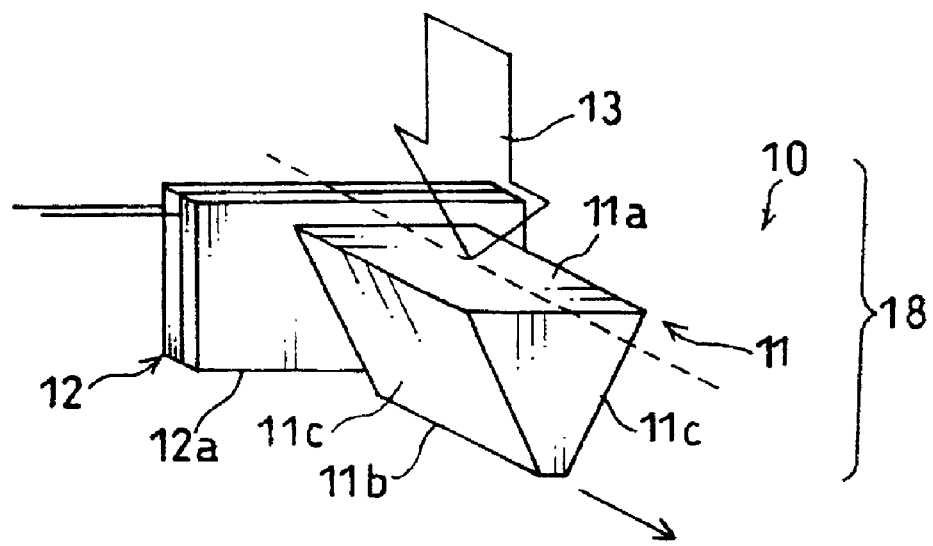
FIG. 1 is a perspective view schematically illustrating essential parts of an information write/read head of the present invention.

In the present embodiment, examples of an information write/read head and an information writing/reading device adopting the same of the present invention will be explained. FIG. 1 is a perspective view schematically illustrating the information write/read head and essential parts of the information writing/reading device adopting the same of the present embodiment. As illustrated in FIG. 1, the information write/read head 18 includes a magnetic head 12, and an optical head 10 for heat-assisting (heating) writing/reading areas of a recording medium by the magnetic head 12.

The magnetic head 12 is, for example, a thin film perpendicular write head or a thin film GMR (giant magnetoresistance) read head, which performs writing or reading operations with respect to the recording medium for writing thereon and reading therefrom information at higher linear density by the heat-assisted write/read system. Therefore, the magnetic head 12 has a magnetic gap 12$a$ in a direction orthogonal to a longitudinal direction of recording tracks formed on the recording medium as will be described later.

Figure 2:
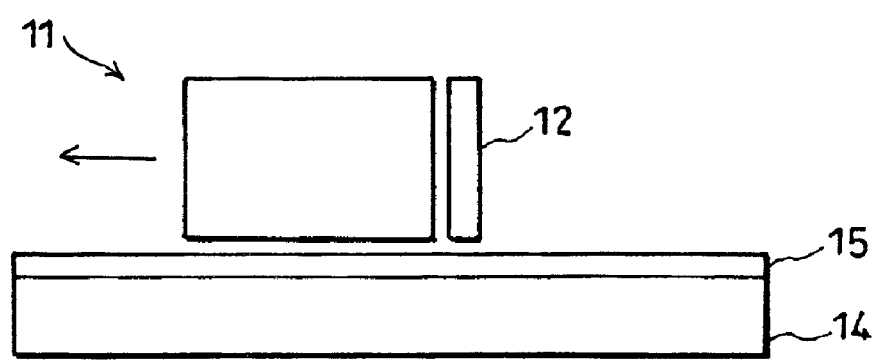
FIG. 2 is a cross-sectional view schematically illustrating the correlation between an information writing/reading disk and the information write/read head of FIG. 1 of the present invention.

For convenience in explanation, as to an optical head 10, only an aperture head 11 which is a part of the optical head 10 is illustrated in FIGS. 1 and 2. The aperture head 11 is made of a light-transmissive material such as SiN or SiO$_2$, and is formed in a shape of obelisk.

The aperture head 11 includes i) a light incident surface 11$a$ of a substantially rectangular shape which serves as an incident surface of a laser beam (light) 13 and ii) an aperture slit 11$b$ (optical slit) of a linear shape, i.e., a thin rectangular shape formed at a leading end, for outputting therethrough the laser beam 13, which are formed in parallel to one another. Therefore, the light incident surface 11$a$ has a larger area than the aperture slit 11$b$.

The aperture head 11 is also structured to be narrower from the light incident surface 11$a$ to the aperture slit 11$b$ formed on the output side of the laser beam. The aperture head 11 is arranged so as to totally reflect light at least by a pair of side faces 11$c$ opposing one another which are provided so as to be inclined with respect to the incident direction of the laser beam 13.

The foregoing aperture head 11 is provided in such a manner that the longitudinal direction of the aperture slit 11$b$ on the output side of the laser beam 13 crosses the longitudinal direction (side to side direction in the figure) of a magnetic gap 12$a$ of the magnetic head 12, preferably at right angles.

As illustrated in FIG. 2, the magnetic head 12 and the aperture head 11 are relatively moved (perform a scanning)

in the direction of an arrow (recording track direction) with respect to a recording medium 15 on a disk substrate 14 for the writing and reading operations. Here, in order to maintain both the magnetic head 12 and the aperture head 11 at a distance of not more than 100 nm from the recording medium 15, the magnetic head 12 and the aperture head 11 are arranged so as to float on or be in contact with the recording medium 15. These magnetic head 12 and the aperture head 11 are desirably manufactured as one integral part in the same process as will be explained later.

Figure 3:
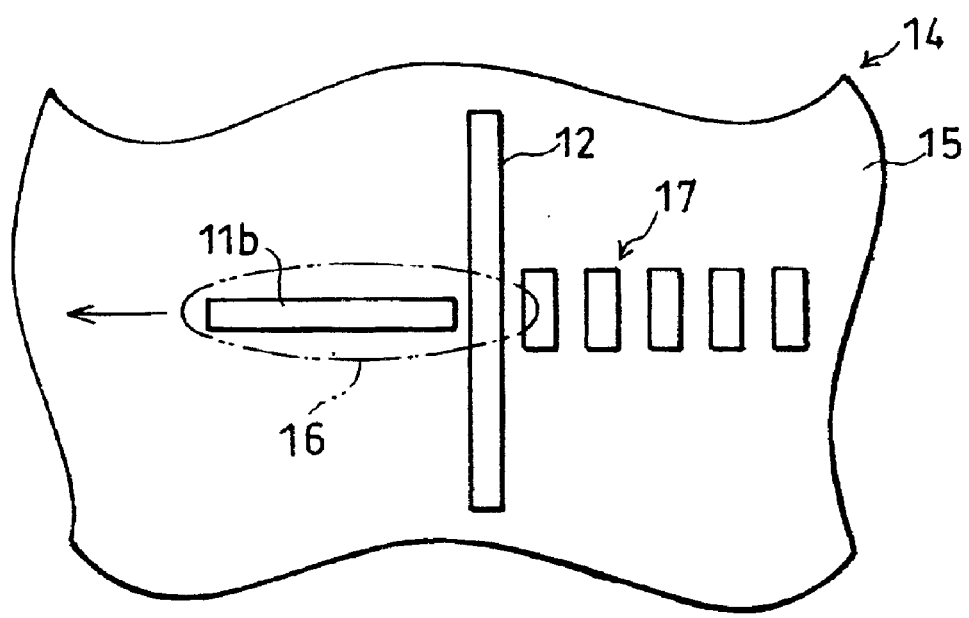
FIG. 3 is an explanatory view illustrating recording marks written on the information writing/reading disk by the information write/read head.

FIG. 3 is an explanatory view illustrating a high density writing operation on the recording tracks by the aperture head 11. The laser beam 13 as reached to the aperture slit 11b of the aperture head 11 is projected onto the recording medium 15 of the disk substrate 14, so as to heat the portion irradiated with the laser beam 13 of the recording medium 15. Here, the longitudinal direction of the aperture slit 11b is set substantially parallel to the longitudinal direction (scanning direction) of the recording tracks of the recording medium 15. This aperture slit 11b is formed in front of the magnetic head 12 in the scanning direction (tracking direction).

The length of the aperture slit 11b in the longitudinal direction is set to be not less than a diameter of a spot converged on the light incident surface 11a of the aperture head 11. For example, this spot diameter is around 0.5 $\mu$m at the minimum, and is around 1 $\mu$m at a wavelength of 630 nm an objective lens of NA=0.6. Here, the width (the length in the widthwise direction) of the aperture slit 11b is set to be not more than the half of the spot diameter, e.g., around 100 nm to 300 nm. In other words, the aperture slit 11b is formed so as to be longer than the diffraction limit of the laser beam 13 in the longitudinal direction, and shorter than the diffraction limit of the laser beam 13 in the widthwise direction.

It is therefore possible to project the laser beam 13 on the recording medium 15 through the aperture slit 11b in a smaller area than that of the normal transmitted light. With the foregoing projected laser beam 13, the position facing the aperture slit 11b and the surrounding portion of the recording medium 15 are heated to be a high temperature area 16.

In the present embodiment, for the recording medium 15 which permits perpendicular magnetic writing/reading, a recording medium made of a magnetic writing material having a magnetic compensation temperature in a vicinity of room temperature may be adopted. The portion which has not been irradiated with the laser beam 13 of the recording medium 15 at temperatures in a vicinity of the magnetic compensation temperature has high coercive force, and therefore no change in magnetization state occurs therein even under an applied magnetic field from the magnetic head 12. On the other hand, in the portion irradiated with the laser beam 13 having a strong intensity (stronger intensity than that used in reproducing) of the recording medium 15, the coercive force is reduced as the temperature thereof is increased, and the magnetization state is varied with ease according to an applied magnetic field from the magnetic head 12. The writing operation performed utilizing the foregoing principle is a so-called heat-assisted writing system.

In the portion which has not been irradiated with the laser beam 13 of the recording medium 15 is not heated, and is maintained at around a magnetic compensation temperature. Therefore, such unheated portion is almost free from the leakage of the magnetic flux even for the recording tracks.

On the other hand, in the portion irradiated with the laser beam 13 having a weak intensity (weaker intensity than that used when recording) of the recording medium 15, the temperature is raised, and the magnetization becomes larger, and the magnetic flux as leaked from the heated portion can be detected by the magnetic head 12. The writing operation performed utilizing the foregoing principle is a so-called heat-assisted reading system.

In the case of writing by the heat-assisted system, a thin film perpendicular write head is adopted as the magnetic head 12, and the magnetization of the recording medium 15 only in the portion where the high temperature area 16 (area heated to or above writing temperature) and the area corresponding to the magnetic head 12 are overlapped is reversed according to writing signals to be input to the magnetic head 12, and the recording marks 17 in the form of digital information are written based on the respective directions of perpendicular magnetization along recording tracks.

Therefore, in the present invention, the width in the direction of tracks of the recording marks 17 is defined by the width of the aperture slit 11b. It is therefore possible to obtain the recording density of the recording track several times to ten times higher than the recording density obtained in the conventional recording method based on the laser spot diameter.

The aperture slit 11b of the aperture head 11 is narrow in width, and an amount of light emitted therethrough is reduced, which may result in the problem that a sufficient recording temperature cannot be obtained. In response, an area of the aperture head 11a of the aperture head 11 illustrated in FIG. 1 is increased to be sufficiently larger than the spot diameter of the laser beam 13 so that the laser beam 13 can be incident on the aperture head 11 in an efficient manner. Here, it is preferable that the length of the heat incident surface 11b in the lengthwise direction on the light emitting side be larger than the spot diameter of the laser beam 13.

For example, in the Journal of Magnetics Society of Japan, vol. 15, Supplement no. S1(1991), pp.351–356, disclosed is the feature wherein the intensity of the reflected light is reduced when the polarized direction of the laser beam is parallel to the slits (guide grooves) formed on the disk. Namely, it is likely that the laser beam incident on the slit pass therethrough without being reflected therefrom.

In view of the foregoing, in the present embodiment, the polarized direction of the laser beam 13 incident on the light incident surface 11a is set in consideration of the longitudinal direction of the aperture slit 11b as illustrated in FIG. 1. Here, it is desirable to set the polarized direction of the laser beam 13 substantially parallel to the longitudinal direction of the aperture slit 11b, more desirably to set the polarized direction of the laser beam 13 in the longitudinal direction of the aperture slit 11b. In this way, the laser beam 13 is more liable to pass through the aperture slit 11b, and the intensity of the light output from the aperture slit 11b can be increased, and it is therefore possible to heat the recording medium 15 in an efficient manner.

In the reading operation of information, a thin film GMR head is adopted as the magnetic head 12, and a laser beam 13 of a lower intensity than that used in recording is projected on the recording medium 15. In the reading operation, the recording marks 17 are read with respect to the portion of the high temperature area 16 heated to the reading temperature which is covered with the magnetic head 12.

Figure 4:
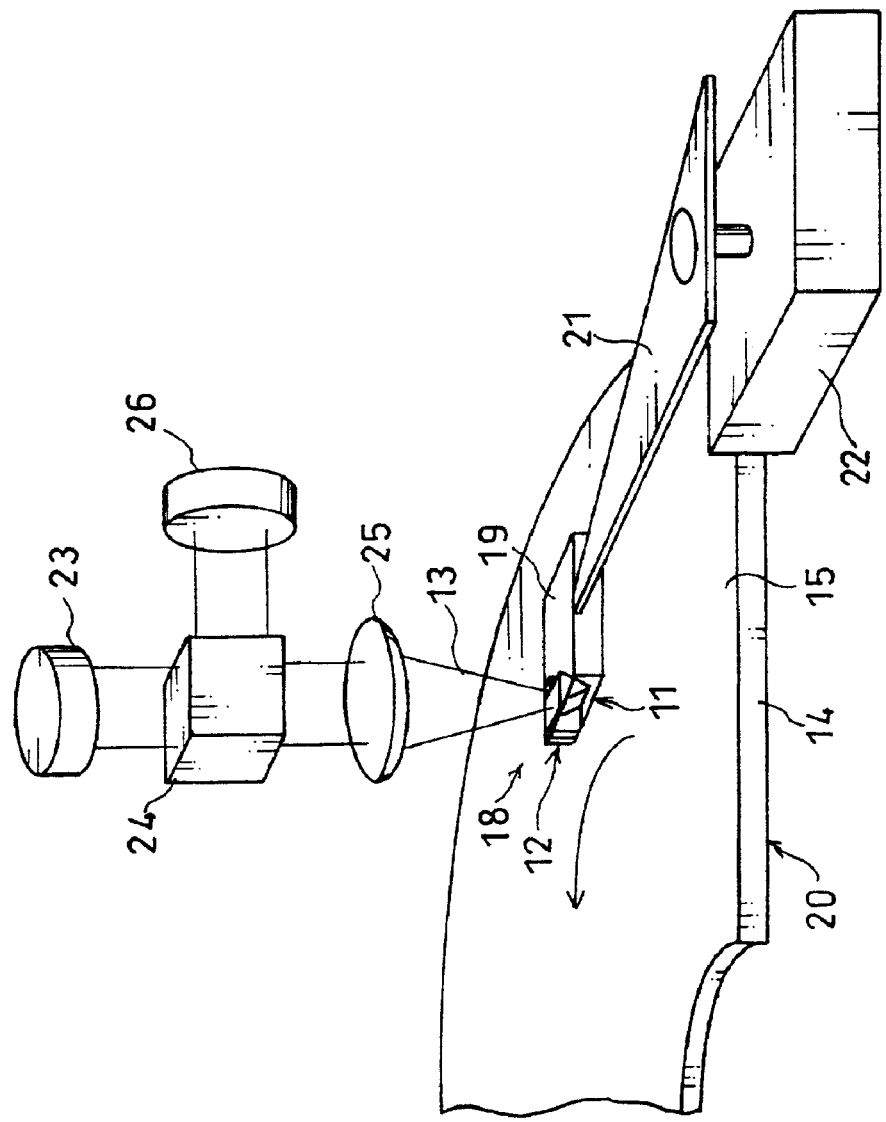
FIG. 4 is an explanatory view of an information writing/reading device of the present invention.

FIG. 4 illustrates essential parts of the information recording/reading device adopting the information write/ read head 18. The information write/read head 18 of the integrated structure of the aperture head 11 and the magnetic head 12 is mounted on a slider 19 so as to be capable of sliding on the recording medium 15 of a disk 20 being rotated. The slider 19 is supported by a suspension 21, and follows or makes an access to a recording track as desired on the recording medium 15 using an actuator 22. A laser beam 13 emitted from a laser diode (semiconductor laser device) 23 is focused by an objective lens 25 onto the light incident surface 11a of the aperture head 11 via a half prism 24.

Further, a light reflected from the recording medium 15 of the disk 20 is returned to the objective lens 25 via the aperture head 11, and is guided to a photodetector 26 by the half prism 24. A signal indicative of an amount of reflected light as detected by the photodetector 26 is fed back to the actuator 22 (to be described later) and is used in performing a tracking at high density.

Here, a second aperture head may be provided opposing the aperture head 11 via the disk 20 for detecting a signal indicative of a light transmitted through the disk 20, and a tracking operation may be performed based on the signal indicative of the transmitted light as detected. However, the foregoing structure has deficiency in that a high precision is required in the positioning of the two aperture heads.

FIG. 5(a) through FIG. 5(f) illustrate respective processes for manufacturing the information write/read head 18 of the integrated structure of the aperture head 11 and the magnetic head 12 shown in FIG. 1. First, on a base 31 (part of the slider) made of $Al_2O_3$—TiC, a ground layer 37 made of, for example, $Al_2O_3$ is laminated to the thickness in the range of from 1 $\mu$m to 5 $\mu$m, and further a light-shielding layer 32 (Si) is formed on the ground layer 37 (STEP 1).

Next, as will be described later, a wave-guiding section 33 (SiN or $SiO_2$) for the laser beam 13 is formed in the light-shielding layer 32 (Si). The wave-guiding section 33 corresponds to the aperture head 11 illustrated in FIG. 1. This wave-guiding section 33 is formed in such a manner that one of the side faces (the side face formed in the backward in the figure) is formed into the light-incident surface 11a, and the other side face (the side face formed to the front side in the figure) is formed in the aperture slit 11b on the light emitting side (STEP 2). For the light-shielding layer 32, a material of a light-shielding property other than Si may be adopted. On the light-shielding layer 32 and the wave-guiding section 33, a light-shielding layer 32a of the similar structure to the light-shielding layer 32 is further laminated to the thickness of around 0.1 $\mu$m (STEP 3), thereby completing the part corresponding to the aperture head 11.

Next, a heat-shielding layer 34 is formed on the light-shielding layer 32a for preventing heat from being propagated from the optical head 10 to the magnetic head 12 (STEP 4). For the heat-shielding layer 34, SiN or $SiO_2$ of low heat conductivity may be laminated to a thickness within a range of from 0.1 $\mu$m to 1 $\mu$m.

Thereafter, a magnetic head 35 (thin film perpendicular write head or a thin film GMR head) is laminated on the heat-shielding layer 34 (STEP 5). This magnetic head 35 is formed in the conventional manufacturing process, and therefore the explanations thereof shall be omitted here. Lastly, a protective layer 36 made of SiN, $SiO_2$ or $Al_2O_3$ is laminated on the magnetic head 35 to the thickness of from 1 $\mu$m to 5 $\mu$m (STEP 6). The foregoing layers can be formed mainly by sputtering.

Figure 5D:
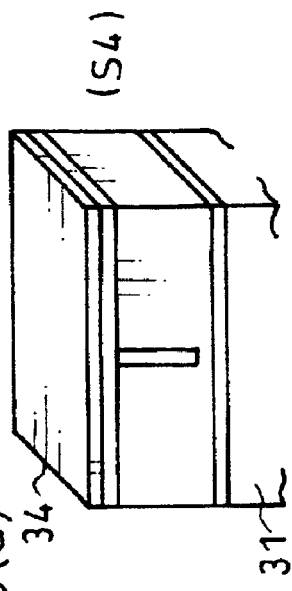
FIG. 5($a$) through FIG. 5($f$) are process diagrams schematically illustrating manufacturing processes of the information write/read head.
Figure 5E:
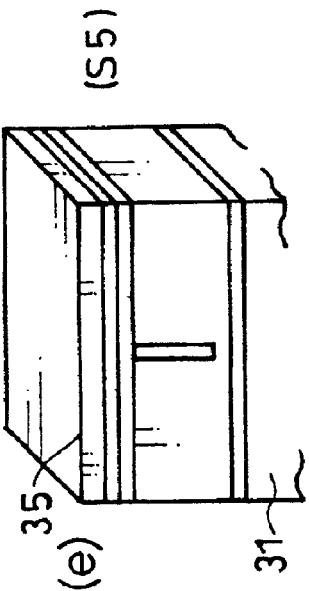
Figure 5F:
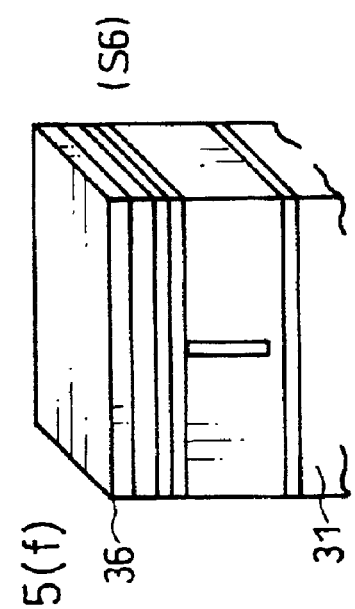
Figure 5A:
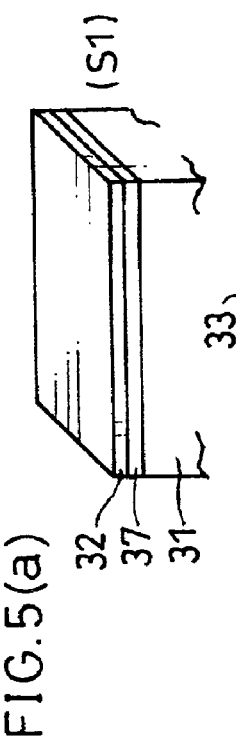
Figure 5B:
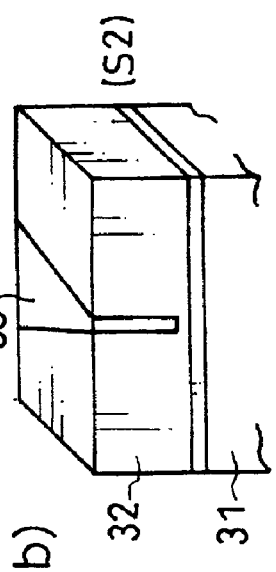
Figure 5C:
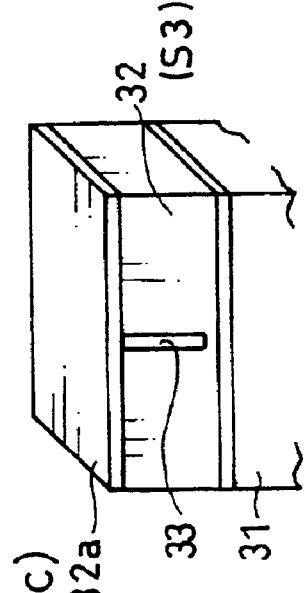

FIG. 6(a) through FIG. 6(e) are process diagrams which explain manufacturing process of the wave-guiding section 33 in the STEP 2 shown in FIG. 5(b) in details. In this example, the wave-guiding section 33 for the laser beam is formed by a so-called lift-off method. On the ground layer 37 made of, for example, $Al_2O_3$, a Si-layer 38 for use in forming the side face and the light-shielding face of the aperture head 11 is laminated in consideration of the diffraction limit of the laser beam 13 (STEP 21). Namely, the Si-layer 38 is laminated to the thickness of, for example, 1.2 $\mu$m so as to have a larger thickness than the above diffraction limit (by 20 to 50%)

Next, a resist 39 is applied onto the Si-layer 38, and a region 40 in which the wave-guiding section 33 is to be formed is exposed so as to remove therefrom the resist 39 (STEP 22). Subsequently, the Si-layer 38 is etched from the region 40 as exposed such that a groove 41 is formed in the shape of the wave-guiding section 33 on the Si-layer 38 remaining at the bottom to the thickness of, for example, 0.2 $\mu$m (STEP 23).

Next, on the Si-layer 38, a layer of SiN or $SiO_2$ is formed so that the groove 41 is filled with the wave-guiding section 33 (SiN or $SiO_2$) (STEP 24). Thereafter, the resist 39 remaining in the STEP 24 is removed using an organic solvent, and further an unnecessary SiN or $SiO_2$ layer 42 is removed from the Si-layer 38 (STEP 25). If desirable smoothness between the respective surfaces of the wave-guiding section 33 and the light-shielding layer 32 cannot be obtained, these surfaces may be smoothed, for example, by the etch-back method.

Second Embodiment

The following descriptions will explain a second embodiment of the present invention in reference to FIG. 7 which illustrates a modified example of the information recording/reading device illustrated in FIG. 4. In the structure illustrated in FIG. 7, the light incident surface 11a of the aperture head 11 is stuck onto the light output end face of a laser diode 51 (semiconductor laser device) so that a laser beam can be directly guided from the light output end face of the laser diode 51 to the aperture head 11.

According to the foregoing structure of FIG. 7, the optical system for guiding the laser beam 13 in FIG. 4 to the aperture head 11 can be simplified. Furthermore, the laser diode 51 and the aperture head 11 can be laminated in the same direction, thereby manufacturing the both into one integral part in the same process.

Third Embodiment

Figure 8:
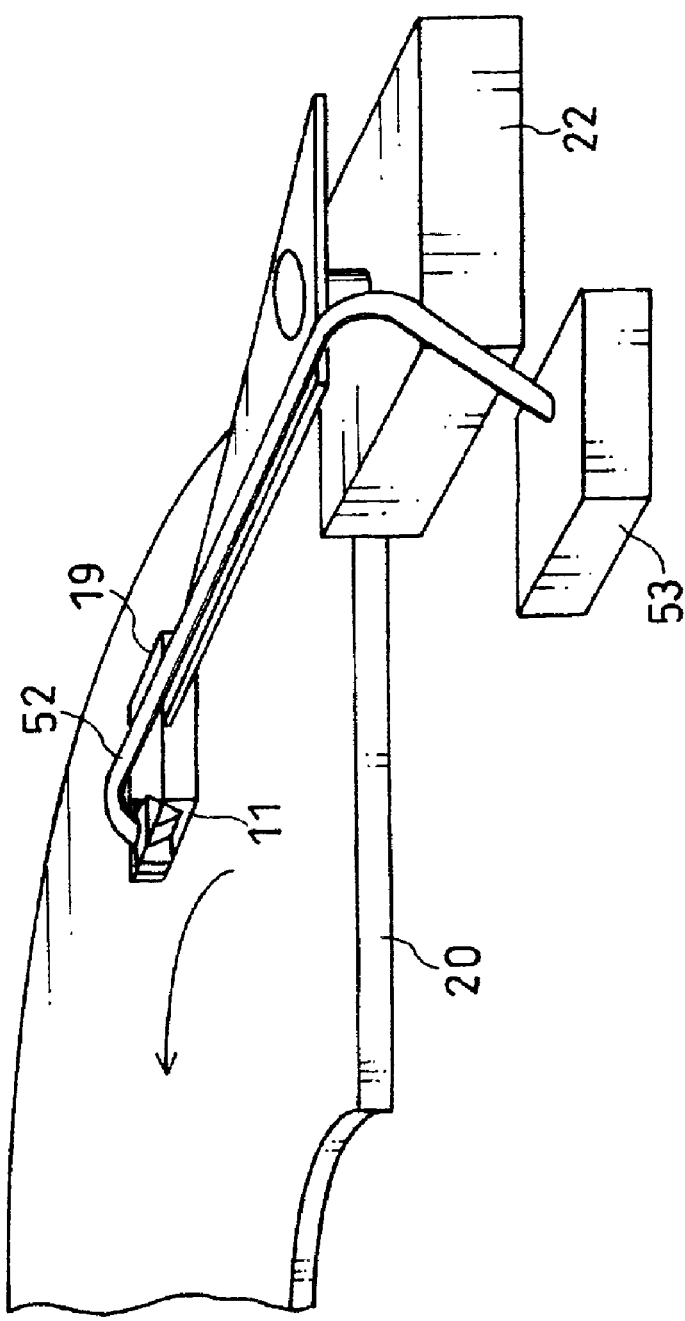
FIG. 8 is an explanatory view illustrating still another information writing/reading device of the present invention.
Figure 9:
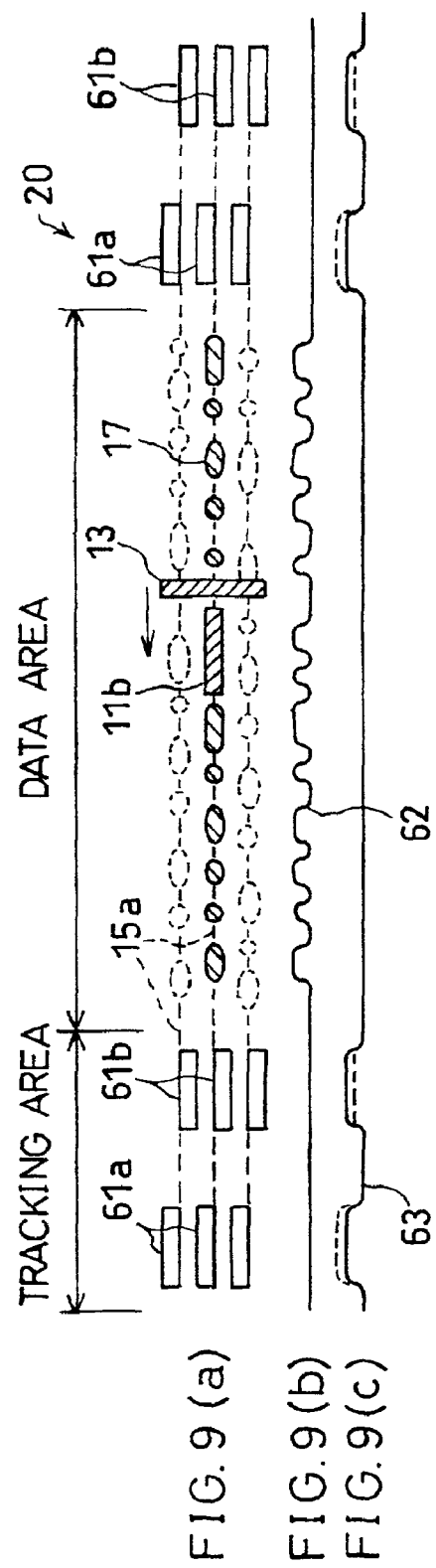
FIG. 9($a$) through FIG. 9($c$) are explanatory views which explain the information writing/reading disk, wherein FIG. 9($a$) is an explanatory view illustrating information written in a tracking area and a data area of the information writing/reading disk respectively, FIG. 9($b$) is a waveform diagram of a reading signal for the data area.

The following descriptions will explain a third embodiment of the present invention in reference to FIG. 8. As illustrated in FIG. 8, the information recording/reading device of the present embodiment is arranged such that an aperture head 11 and an optical system 53 are optically connected via an optical fiber 52.

According to the foregoing structure, it is not necessarily to form the optical system on the aperture head 11, and it is therefore possible to realize a thinner structure.

Fourth Embodiment

In this fourth embodiment, a recording/reading method adopting the foregoing information write/read head will be explained in reference to FIG. 9(a) through FIG. 9(c). These FIG. 9(a) through FIG. 9(c) are explanatory views illustrating a tracking operation by the information write/read head 18 illustrated in FIG. 4 with respect to the recording tracks 15a of the disk 20 as a writing/reading disk (information recording medium) of the present invention.

As illustrated in FIG. 9(a), on the disk 20, a tracking area and a data area are formed along a lengthwise direction of the recording tracks 15a, desirably alternately. The tracking area is provided for writing respective tracking-use marks 61a and 61b having substantially rectangular cross-section in the form of protrusions and recessions. The data area is composed of, for example, a TbFeCo layer, and is provided for writing/reading recording marks 17 written magnetically. As described, in the data area, the recording marks 17 are written/read by the magnetic head 12 and the laser beam 13 passed through the aperture slit 11b. As illustrated in FIG. 9(b), by reading the recording marks 17 from the data area, a reading signal 62 can be obtained.

In the tracking area, pairs of tracking-use marks 61a and the tracking-use marks 61b are formed alternately in such a manner that each pair is constituted by a tracking-use mark 61a formed on one side of a central line of the recording track 15a indicated by a dotted line in the FIG. 9(a) and a tracking-use mark 61b formed on the other side of the central line. Namely, the left long side (first long side) of the tracking-use mark 61a with respect to the scanning direction (shown by an arrow in FIG. 9(a)) is formed along the central line, and the right long side (second long side) of the tracking-use mark 61b is formed along the scanning direction.

In other words, the tracking-use marks 61a and 61b of substantially the same shape are formed continuously at predetermined intervals in the tracking direction. These tracking-use marks 61a and 61b are alternately displaced one another in the direction orthogonal to the tracking direction. It is preferable that this mutual displacement in the direction orthogonal to the tracking direction is offset mutually in opposite directions by the same amount of offset with respect to the central line shown by a dotted line of the recording track 15a. Here, it is more preferable that one of the ends formed substantially parallel to the tracking direction of each of the tracking-use marks 61a and 61b be on the central line of the adjacent recording track 15a by setting the offset amount to around ½ of the width (the length in the direction orthogonal to the tracking direction) of the tracking-use marks 61a and 61b as illustrated in FIG. 9(a).

For the shape of the tracking-use marks 61a and 61b, it is preferable to be longer in the direction along the recording tracks 15a and shorter in the direction orthogonal to the recording tracks 15a (the radial direction of the disk 20) so as to correspond to the shape of the aperture slit 11b. The length of the tracking-use marks 61a and 61b along the recording tracks 15a may be set to be longer than the diffraction limit of the laser beam 13 from the aperture slit 11b. On the other hand, the length of the tracking-use marks 61a and 61b orthogonal to the recording track 15a may be set to be shorter than the diffraction limit of the laser beam 13.

According to the foregoing arrangement of the disk 20, it is possible to detect the respective tracking-use marks 61a and 61b efficiently using the laser beam 13 from the aperture slit 11b. Moreover, the respective tracking-use marks 61a and 61b can be detected in the direction orthogonal to the recording tracks 15a with high resolution. In the case the laser beam 13 from the aperture slit 11b passes on the central line of the recording track 15a, as illustrated in FIG. 9(c), a reflect light amount signal 63 which is a signal obtained by detecting the reflected light of the laser beam 13 from the disk 20, which has been passed through the aperture slit 11b becomes as follows. That is, the reflect light amount signal 63 obtained by detecting the reflected light from the position of the tracking-use mark 61a has the same amplitude as the reflect light amount signal 63 obtained by detecting the reflected light from the tracking-use mark 61b.

However, when the light from the aperture slit 11b is displaced from the center of the recording track 15a, the reflect light amount signal 63 corresponding to the tracking-use mark 61a has a different signal amplitude from the reflect light amount signal 63 corresponding to the tracking-use mark 61b as shown by dotted lines in FIG. 9(c). Moreover, which of the reflect light amount signals 63 from the tracking-use marks 61a and 61b has a larger signal amplitude differs depending on the direction the laser beam 13 from the aperture slit 11b deviates.

Therefore, as will be explained later, it is possible to perform a tracking control with high precision using a difference signal obtained by detecting respective signal amplitudes of the tracking-use marks 61a and 61b. Moreover, since the tracking-use marks can be detected with high resolution, it is possible to increase a recording density by reducing pitches between recording tracks 15a compared to the conventional structure.

Figure 10:
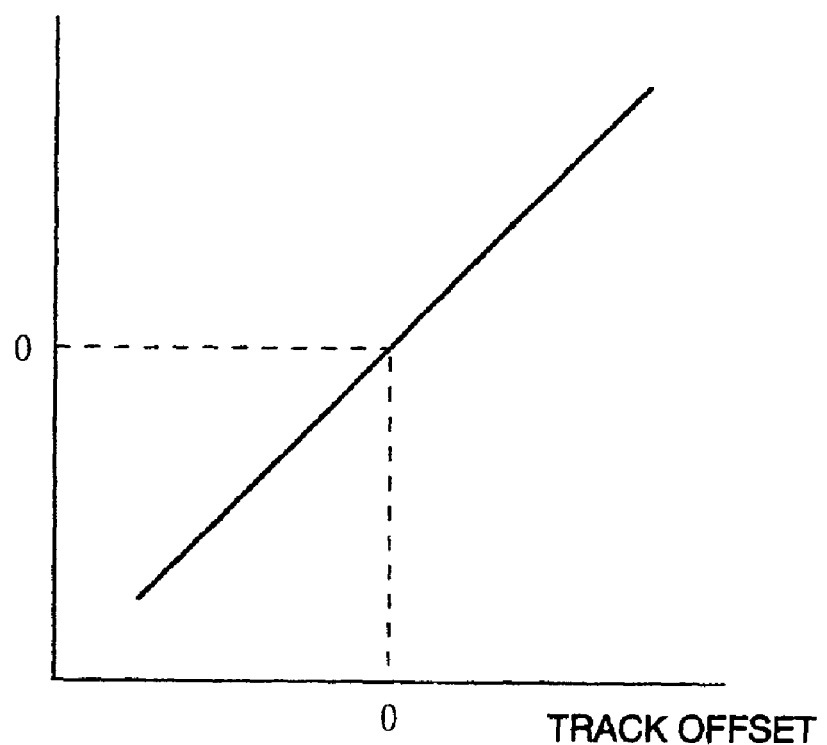
FIG. 10 is a graph which explains a tracking control of the information writing/reading device.

FIG. 10 shows a graph which explains the foregoing difference signal. When the offset amount of the laser beam 13 from the aperture slit 11b with respect to the central line of the recording track 15a is zero, the respective signal amplitudes corresponding to the tracking-use marks 61a and 61b become the same, and therefore the resulting difference signal becomes zero. On the other hand, when the offset amount of the laser beam 13 from the aperture slit 11b is positive (for example, in the upwards direction in FIG. 9), the resulting difference signal also becomes positive. Similarly, when the offset amount of the laser beam 13 from the aperture slit 11b is negative (for example, in the downwards direction in FIG. 9), the resulting difference signal also becomes negative. Here, by negatively feeding back the difference signal to the actuator 22 illustrated in FIG. 4, it is possible to track the recording tracks 15a with high precision.

Figure 11:
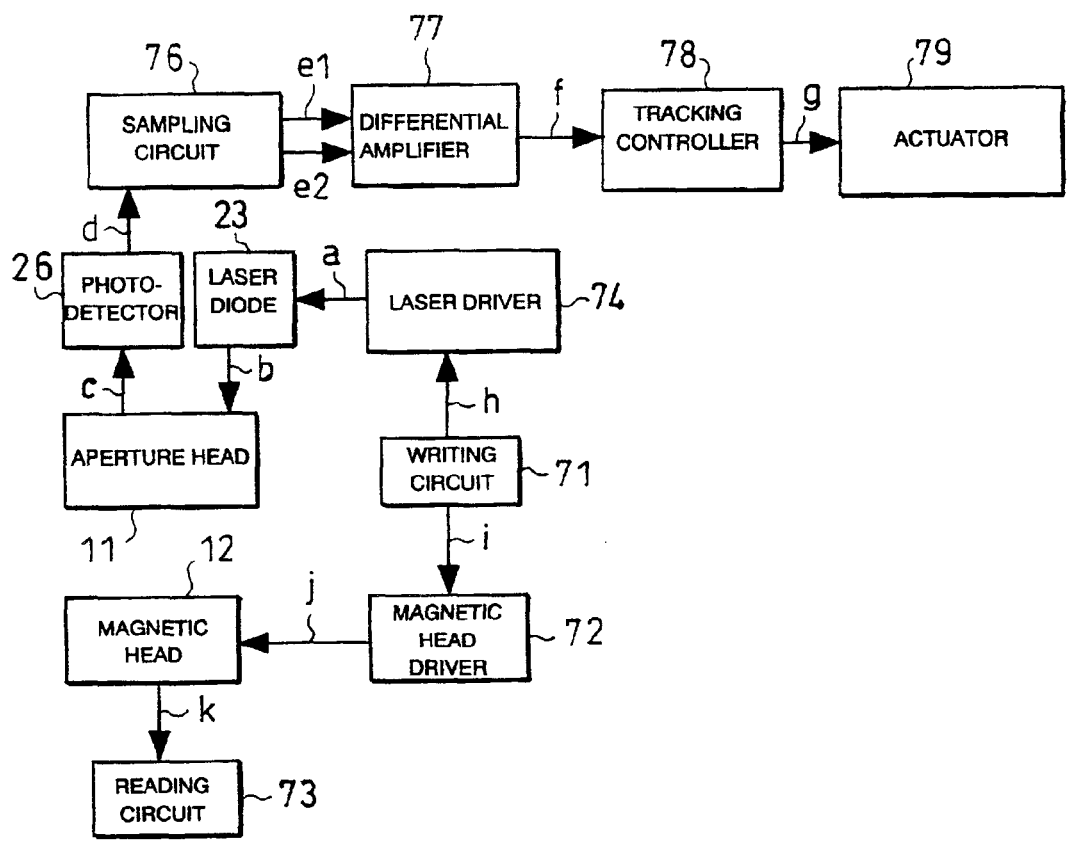
FIG. 11 is a block diagram schematically illustrating the information writing/reading device.
Figure 12:
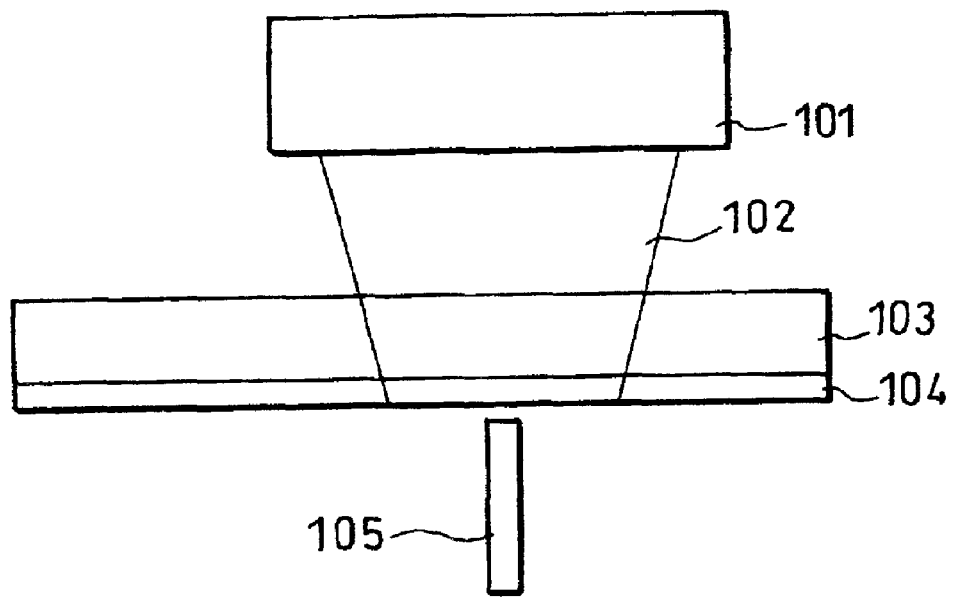
FIG. 12 is an explanatory view illustrating essential parts of a conventional writing/reading device.
Figure 13:
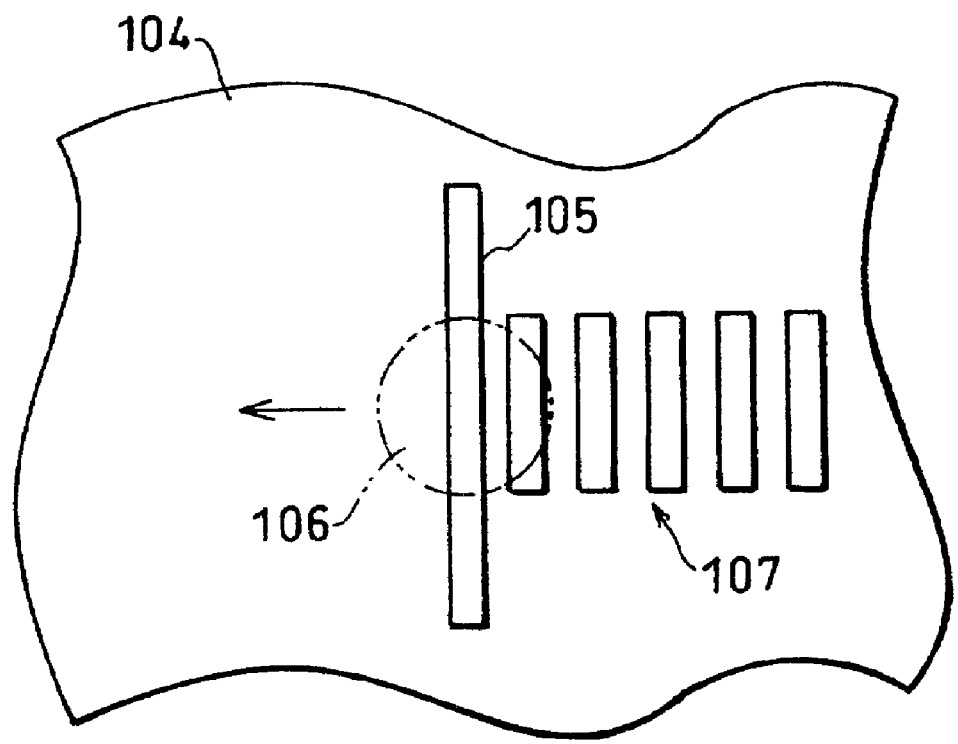
FIG. 13 is an explanatory view illustrating the formation of recording marks in the conventional information writing/reading device of FIG. 12.

FIG. 11 is a block diagram illustrating the flow of the signal of the foregoing information writing/reading device. As illustrated in this block diagram, a drive current a is output from the laser driver 74 to the laser diode 23, and an emitted light b of the laser beam 13 is guided to the aperture head 11. The reflected light c which passed through the aperture head 11 is detected by the photodetector 26 where the reflected light c as detected is converted into an electric signal d. The signal amplitudes of electric signals d corresponding to the tracking-use marks 61a and 62b respectively, are sampled as signals e1 and e2 by the sampling circuit 76. The signals e1 and e2 as sampled are input to the differential amplifier 77, and a difference signal f is formed by the differential amplifier 77. The resulting difference signal f is input to the tracking controller 78 where an actuator drive signal g according to the difference signal f is generated. This actuator drive signal g is fed back into the tracking actuator 79, for use in tracking control.

When writing, a control signal h is sent from the writing circuit 71 to the laser driver 74, and the laser beam 13 having a stronger intensity than that used when reading is emitted from the semiconductor laser 23. Next, the writing data i is sent from the writing circuit 71 to a magnetic head driver 72, and the writing data i is converted into a writing signal j by the magnetic head driver 72, and the resulting writing signal j is input to the magnetic head 12. Then, from the magnetic head 12, a writing magnetic field according to the writing signal j is generated, thereby writing data on the recording medium 15.

On the other hand, when reading, it is controlled such that the laser beam 13 having a lower intensity than that used when writing is emitted from the laser diode 23, and a reading signal k from the magnetic head 12 is sent to a reading circuit 73, thereby reading data from the recording medium 15.

An information write/read head in accordance with the present invention may be arranged so as to include: data writing or reading-use head mounted in such a manner that the longitudinal direction thereof forms a right angle with respect to the scanning direction (tracking direction); and an optical slit of a length of not shorter than a diffraction light of a light beam and a width of not wider than the diffraction limit of the light beam in a direction orthogonal to recording tracks, the optical slit being formed in such a manner that the longitudinal direction being aligned in the scanning direction, wherein the magnetic head and the optical slit are formed in close proximity.

The foregoing information write/read head may be further arranged such that a polarized direction of the light source is coincides with the longitudinal direction of the optical slit.

An information writing/reading device of the present invention may be arranged so as to include:

a slider which slides on an information writing/reading disk, for mounting any of the foregoing information write/read heads;

writing means for outputting a writing signal to the magnetic head;

reading means for inputting a reading signal from the magnetic head; and converging means for converging a laser beam with respect to the optical slit.

The information writing/reading device may be arranged such that a light transmitted through or reflected from the optical slit is detected, and a tracking operation is performed using the transmitted light or reflected light.

A writing/reading disk of the present invention may be arranged so as to include tracking-use marks of a length of not shorter than a diffraction limit of a light beam in a direction along recording tracks and of a width of not wider than the diffraction limit of the light beam in a direction orthogonal to the recording tracks, wherein the tracking-use marks are formed alternately with data write areas in a direction of the recording tracks.

The foregoing information write/read head and the information writing/reading device have been explained through case of adopting the disk-shaped recording medium 15; however, the recording medium 15 of the present invention is not limited to those of disk-shaped, and, for example, tape-shaped recording media may be equally adopted.

In each of the foregoing preferred embodiments, explanations have been given through the case where as the recording medium 15, the magnetic recording medium which is suited for recording and reproducing information in the heat-assisted system is adopted. However, the recording medium applicable to the foregoing tracking system of the present invention is not limited to the above magnetic recording medium, and, for example, a phase change recording medium for recording thereon information based on changes in phase, or an organic dye recording medium for recording thereon information based on changes in organic dye structure may be adopted as well.

Namely, any information recording medium, having tracking-use marks formed along recording tracks, wherein the tracking-use marks have a length of not shorter than a diffraction limit of a light beam in a direction along the recording tracks and a width of not wider than the diffraction limit of the light beam in a direction orthogonal to the recording tracks, may be adopted in the present invention. As long as the foregoing tracking-use marks are formed, recording media (magnetic recording medium, phase change recording medium, an organic dye recording medium, etc.) suited for the foregoing tracking system may be achieved irrespectively of the type of the information recording system.

The forgoing tracking-use marks cannot be read out by the generally-used optical recording/reproducing disk device. In order to apply the foregoing tracking system to the recording medium having formed thereon the tracking-use marks, the following tracking device may be adopted. That is, the tracking device may include an optical slit (the aperture slit 11b of the aperture head 11 as illustrated in FIG. 1) which allows a light beam to pass therethrough to be guided to the recording medium; and tracking means which detects a light beam transmitted through or reflected from the recording medium, which has passed through the optical slit, and performs a tracking operation of the recording tracks based on the transmitted light or the reflected light as detected, wherein the optical slit has a light emitting section whose width is shorter than the diffraction limit as described above. The foregoing tracking means can be realized, for example, by the structure including the photodetector 26, the sampling circuit 76, the differential amplifier 77, the tracking controller 78 and the tracking actuator 79 as illustrated in FIG. 11.

In respective preferred embodiments, explanations have been given through the case of adopting the tracking marks in form of protrusions and recessions formed by changing the physical shape of the surface of the recording medium; however, the tracking marks of the present invention are not limited to the above tracking marks. As below-explained, tracking marks may be formed based on changes in refractive index (the refractive index of the tracking marks differ from that of other portion adjacent to the marks). Namely, by arranging such that the refractive index of the area for use in forming the tracking marks differs from that of other area adjacent to the marks, the difference arises in intensity of a light beam projected onto the recording medium and is reflected therefrom or transmitted therethrough. Utilizing the foregoing characteristic, it is therefore possible to detect the tracking-use marks also by the foregoing tracking device in the same manner as that adopted in the preferred embodiments.

The tracking marks in form of protrusions and recessions adopted in the preferred embodiments are to be considered as one type of the tracking-use marks formed based on changes in refractive index. Here, the refractive index of the area for use in tracking-use marks indicates the diffractive index of gas (normally air) existing in the area, and the diffractive index of other area indicates the refractive index of a material used in the recording medium. In the case of adopting the tracking-use marks in form of protrusions and recessions, the difference in refractive index between the tracking-use marks and other area becomes significant, and the tracking-use marks in form of protrusions and recessions are therefore advantageous in that signals of tracking-use marks can be obtained with ease.

Tracking-use marks without protrusions and recessions can be obtained by forming (filling) the area for use in forming the tracking-use marks with a material having different refractive index from that of a material adopted in other area.

The tracking-use marks may be formed also in phase-change recording. For example, by forming the area for use in forming the tracking-use marks in an amorphous state (or crystalline state), while other area in crystalline state (or amorphous state), it is possible to form tracking-use marks based on changes in refractive index.

The above-explained changes in refractive index may be considered as changes in optical constant or changes in optical characteristics. Therefore, the only condition to be applicable to the present invention is that the area for use in forming the tracking-use marks and other area have different indexes of reflectance or transmittance of light projected onto the recording medium.

For the tracking method according to the present invention, the following method may be adopted, wherein firstly, the width (in the direction orthogonal to the track direction) of the tracking-use marks is set to be smaller than the diffraction limit, and then the length (in the track direction) of the tracking-use marks and the optical slit (the aperture slit 11b of the aperture head 11 shown in FIG. 1) is set to be larger than the diffraction limit and the polarized direction of a light beam incident onto the optical slit is set to the longitudinal direction of the optical slit, thereby reproducing the tracking-use marks by means of the optical slit whose width is smaller than the diffraction limit.

According to the foregoing method, an amount of light transmitted through or reflected from the tracking-use marks can be increased, and thus a track error signal of high S/N can be obtained. As a result, it is possible to perform a high-precision tracking operation under stable condition with respect to the tracking-use marks having a smaller track pitch (high density recording) than the diffraction limit.

A conventional high density tracking method is disclosed, for example, in Japanese Laid-Open Patent Publication No. 185264/1999 (Tokukaihei 11-185264) wherein a well known sample servo system for an optical disk is applied. In this conventional method, tracking-use marks are read out by a known pickup for an optical disk, and a laser spot has a larger diameter than the diffraction limit. However, the tracking-use marks of this publication to be read out at each track are formed at small intervals so as to realize a smaller track pitch than the diffraction limit. As a result, it is possible to realize a higher density track than the diffraction limit using a conventional optical system.

However, the method of the above publication has a drawback in that due to the tracking-use marks which are larger than the diffraction limit, a precision in detecting a track position is lowered. Namely, when adopting the tracking-use marks for detecting a tracking position which are larger than the diffraction limit, an S/N of a tracking error signal is lowered accordingly, and when adopting a recording medium having a smaller track pitch than the diffraction limit, a tracking precision is lowered.

In contrast, according the disk 20 and the tracking device of the present invention, the tracking-use marks and the optical slit have a smaller width than the diffraction limit, and with this structure, it is therefore possible to perform a high precision recording without the problem of lower tracking precision.

As described, the information write/read head of the present invention is characterized by including:

a magnetic head for magnetically writing or reading information with respect to recording tracks on a recording medium for writing thereon or reading therefrom information by the heat-assisted system; and an optical slit for heating the recording tracks by projecting therethrough a light beam, the optical slit having a light emitting section of a width of not wider than a diffraction limit of the light beam.

According to the foregoing structure, even for the optical slit for heating the recording tracks with an application of light has the light emitting section whose width is not wider than the diffraction light of light, the light emitted from the optical slit reaches the recording track from the surface of the optical slit facing the recording track, and the magnetic head can therefore write or read information magnetically with respect to the write head as heated with an application of the emitted light by the heat-assisted system.

Moreover, according to the foregoing structure, by forming the optical slit having the light emitting section whose width is not wider than the diffraction limit of light, narrower recording tracks can be realized which leads to a higher recording track density, thereby writing information on a recording medium at a significantly improved recording density as compared to the case of adopting the conventional heat-assisted system wherein the width of the recording tracks is determined by a spot diameter which cannot be made any smaller than the diffraction limit of light as incident on the information writing/reading medium.

Namely, by adopting the foregoing optical slit, it is possible to reduce the width of the recording tracks to be shorter than the diffraction limit of light being used, and the recording tracks of the width defined by the optical slit can be realized, thereby obtaining the effect of increasing the recording track density to from several to ten times higher than that of the conventional method wherein the recording track width is defined by the laser spot diameter.

It is preferable that the foregoing information write/read head be arranged so as to have a light emitting section whose length is not shorter than a diffraction limit of light, and that the longitudinal direction of the light emitting section intersects the longitudinal direction of a magnetic gap of the magnetic head.

According to the foregoing arrangement, the optical slit having the light emitting section whose length in the lengthwise direction is not shorter than the diffraction limit of light is formed so as to intersect the longitudinal direction of the magnetic gap of the magnetic head. It is therefore possible to increase the amount of light emitted from the optical slit with respect to a target recording track, and the target recording track subjected to writing or reading can be heated in a shorter period of time, thereby realizing higher speed writing and/or reading information.

It is preferable that the foregoing information write/read head be arranged such that the polarized direction of light incident on the optical slit is set based on the longitudinal direction of the optical slit.

According to the foregoing structure, by setting the polarized direction of light such as light beam to be incident on the optical slit based on the longitudinal direction of the optical slit, for example, to be coincide with the longitudinal direction, it is possible to increase the intensity of light emitted from the optical slit. As a result, it is possible to heat the recording medium efficiently.

The information writing/reading device of the present invention is characterized by including:

any one of the foregoing information write/read heads;

a slider for scanning an information writing/reading disk (recording medium);

writing means for outputting a writing signal with respect to the magnetic head;

reading means for receiving a reading signal from the magnetic head; and converging means for converging light onto the optical slit.

According to the foregoing structure, by adopting the information write/read head of the present invention, it is possible to improve the recording density or to perform writing and/or reading operations under stable conditions.

The information writing/reading device of the present invention offers the effect of increasing the recording track density to from several to ten times higher than that of the conventional method wherein the recording track width is defined by the laser spot diameter.

It is preferable that the information writing/reading device be arranged so as to include tracking means which detects light transmitted through or reflected from the optical slit and performs a tracking of the recording track based on the transmitted or reflected light as detected. According to the foregoing structure, by adopting the foregoing optical slit, the transmitted light or reflected light from the optical slit can be increased, and it is therefore possible to perform a tracking operation under stable condition.

A writing/reading disk of the present invention is characterized by including tracking-use marks for writing information based on changes in refractive index, formed along recording tracks; and data areas for writing information magnetically, formed along the recording tracks, wherein:

the tracking-use marks have a length of not shorter than a diffraction limit of a light beam in a direction along the recording tracks and a width of not wider than the diffraction limit of the light beam along the recording tracks.

According to the foregoing structure, the tracking-use marks are formed to be longer in the direction along the recording tracks, and shorter in the direction orthogonal to the recording tracks, corresponding to the shape of the optical slit. It is therefore possible to detect each long side of the tracking-use mark efficiently using light emitted from the optical slit. Moreover, a high resolution can be realized in the direction orthogonal to the recording track, and it is therefore possible to perform a tracking control with high precision.

The foregoing writing/reading disk may be further arranged such that the tracking-use marks include first tracking-use marks having first and second long sides opposing one another, the first long side being formed along a central line of the recording track in the data area, and second tracking-use marks having first and second long sides opposing one another, the second long side being formed along the central line of the recording track in the data area.

According to the foregoing structure wherein the tracking-use marks including the first tracking-use marks and the second tracking-use marks, when light beams emitted from the optical slit are incident on respective long sides of the first tracking-use mark and the second-tracking use mark, light reflected from or transmitted through the respective long sides greatly vary due to a deviation in tracking. As a result, it is possible to perform a tracking operation under stable condition.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An information write/read head for a heat-assisted read/write system wherein a recording track on a recording medium is partially heated by projecting thereto a light beam, comprising:

a magnetic head for magnetically recording or reading information with respect to the recording track, said magnetic head having a magnetic gap in a longitudinal direction substantially orthogonal to a longitudinal direction of said recording track; and an optical slit which allows the light beam for use in heating the recording track to pass therethrough to be guided to the recording track, wherein said optical slit includes a light emitting section, a longitudinal direction of which is set substantially parallel to the longitudinal direction of the recording track, and whose width in a width wise direction is shorter than a diffraction limit of the light beam.

2. The information write/read head as set forth in claim 1, wherein:

the light emitting section of said optical slit has a length in a longitudinal direction of not shorter than the diffraction limit of the light beam.

3. The information write/read head as set forth in claim 2, wherein:

said optical slit is formed in such a manner that a longitudinal direction of the light emitting section intersects with a longitudinal direction of a magnetic gap of said magnetic head.

4. The information write/read head as set forth in claim 1, wherein:

said optical slit is formed in such a manner that its longitudinal direction is substantially parallel to a polarized direction of the light beam to be incident onto said optical slit.

5. The information write/read head as set forth in claim 1, wherein:

said optical slit is formed in such a manner that its longitudinal direction coincides with a polarized direction of the light beam to be incident onto said optical slit.

6. The information write/read head as set forth in claim 1, wherein:

said optical slit has a light incident section of a larger area than the light emitting section.

7. The information write/read head as set forth in claim 6, wherein:

said optical slit has two side parts facing one another which extend from the light incident section to the light emitting section, said two side parts being inclined with respect to a light incident direction, and said two side parts totally reflect light incident from the light incident section.

8. The information write/read head as set forth in claim 1, wherein:

said optical slit is made of a light-transmissive material.

9. The information write/read head as set forth in claim 1, wherein:

said magnetic head and said optical slit are formed in one integral part.

10. The information write/read head as set forth in claim 9, further comprising:

a heat-shielding layer formed between said magnetic head and said optical slit.

11. The information write/read head as set forth in claim 1, wherein:

said optical slit is formed in such a manner that its longitudinal direction is substantially parallel to a longitudinal direction of the recording tracks.

12. The information write/read head as set forth in claim 1, wherein:

said optical slit is formed in front of said magnetic head in a scanning direction of the recording tracks.

13. An information writing/reading device for a heat-assisted read/write system wherein a recording track on a recording medium is partially heated by projecting thereto a light beam, comprising:

an information write/read head which includes i) a magnetic head for magnetically recording or reading information with respect to the recording track, said magnetic head having a magnetic gap in a longitudinal direction substantially orthogonal to a longitudinal direction of said recording track; and ii) an optical slit which allows the light beam for use in heating the recording track to pass therethrough to be guided to the recording track, wherein said optical slit includes a light emitting section, a longitudinal direction of which is set substantially parallel to the longitudinal direction of the recording track, and whose width in widthwise direction is shorter than a diffraction limit of light beam;

an optical system for guiding the light beam to a light incident section of said optical slit.

14. The information writing/reading device as set forth in claim 13, wherein:

said optical system includes a semiconductor laser device, and said semiconductor laser device is formed in such a manner that its laser outputs end face is put together with the light incident section of said optical slit.

15. The information writing/reading device as set forth in claim 13, wherein:

said optical system further includes an optical fiber, and the light beam is guided to the light incident section of said optical slit via said optical fiber.

16. The information writing/reading device as set forth in claim 13, further comprising:

a slider for scanning on an information writing/reading disk as a recording medium;

writing means for outputting a writing signal with respect to said magnetic head; and reading means for inputting a reading signal from said magnetic head.

17. The information writing/reading device as set forth in claim 13, further comprising:

tracking means which detects a light beam transmitted through or reflected from said recording medium, which has passed through said optical slit, and performs a tracking operation of the recording tracks based on the transmitted light or the reflected light as detected.

18. An information write/read head, comprising:

a magnetic head for magnetically writing or reading information with respect to recording tracks on a recording medium for writing thereon or reading therefrom information by a heat-assisted system, said magnetic head having a magnetic gap in longitudinal direction substantially orthogonal to a longitudinal direction of said recording track; and an optical slit for heating the recording tracks by projecting therethrough a light beam, said optical slit having a light emitting section, a longitudinal direction of which is set substantially parallel to the longitudinal direction of the recording track, and whose width in a widthwise direction is not wider than a diffraction limit of the light beam.

19. The information write/read head as set forth in claim 18, wherein:

said optical slit includes a light emitting section whose length in a longitudinal direction is not shorter than the diffraction limit of the light beam, and a longitudinal direction of the light emitting section intersects a longitudinal direction of a magnetic gap of said magnetic head.

20. The information write/read head as set forth in claim 18, wherein:

a polarized direction of the light beam to be incident onto said optical slit is determined based on the longitudinal direction of said optical slit.

21. An information writing/reading device, comprising:

an information write/read head, which includes:

i) a magnetic head for magnetically writing or reading information with respect to recording tracks on a recording medium for writing thereon or reading therefrom information by a heat-assisted system, said magnetic head having a magnetic gap in a longitudinal direction substantially orthogonal to a longitudinal direction of said recording track; and ii) an optical slit for heating the recording tracks by projecting therethrough a light beam, said optical slit having a light emitting section, a longitudinal direction of which is set substantially parallel to the longitudinal direction of the recording track, and whose width in a widthwise direction is not wider than a diffraction limit of the light beam;

a slider which mounts thereon said information write/read head, for scanning an information writing/reading disk as a recording medium;

writing means for outputting a writing signal with respect to the magnetic head;

reading means for receiving a reading signal from the magnetic head; and converging means for converging light onto the optical slit.

22. The information writing/reading device as set forth in claim 21, further comprising:

tracking means which detects a light beam transmitted through or reflected from said recording medium, which has passed through said optical slit, and performs a tracking operation of the recording tracks based on the transmitted light or the reflected light as detected.

* * * * *